Aug. 26, 1969  R. F. BAKER  3,463,527
FAILSAFE EXPANDABLE BOLT ASSEMBLY
Filed April 18, 1968
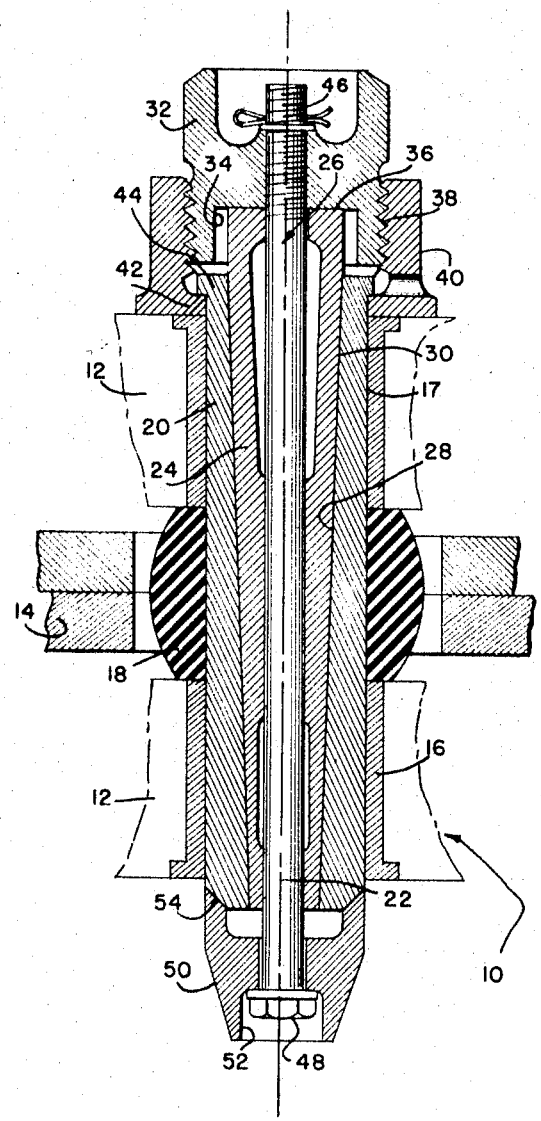
*INVENTOR*
RALPH F. BAKER
BY  *Harry S. Boyd*
*ATTORNEY*

United States Patent Office 3,463,527
Patented Aug. 26, 1969

3,463,527
FAILSAFE EXPANDABLE BOLT ASSEMBLY
Ralph F. Baker, San Diego, Calif., assignor to the United States of America as represented by the Secretary of the Army and/or the Administrator of the Federal Aviation Administration
Filed Apr. 18, 1968, Ser. No. 722,294
Int. Cl. F16b 1/00, 7/00
U.S. Cl. 287—189.36
3 Claims

ABSTRACT OF THE DISCLOSURE

An expandable bolt assembly containing redundant components designed to maintain the joint formed by the bolt in the event one component breaks. The redundancy occurs through the use of two concentric wedging sleeves fixed to the joint independently of a tie-down bolt which assists in holding the sleeves in position.

BACKGROUND OF THE INVENTION

Field of the invention

This invention relates to a safety bolt used in joining two structural parts and more particularly to an expandable bolt used to join together parts subject to considerable stress under circumstances which do not readily allow a repair in the event one component of the bolt should fail.

Description of the prior art

A number of expandable bolts have been designed in the past utilizing wedging surfaces to force the bolt against the walls of the hole into which it is inserted. An example of this is the bolt disclosed in U.S. Patent No. 3,009,747, issued to K. H. Pitzer on Nov. 21, 1961. None of these are failsafe, however, because no redundancy has been provided. Failure of a single element of the bolt assembly usually results in the loss of the structural capability of the joint. In the bolt assembly of the aforesaid patent, failure of the tie-down bolt will destroy the joint. Such a bolt assembly does not meet the demands encountered in the aircraft industry, for example, where the inflight failure of a bolt on an engine mount cannot be immediately repaired. In such a case, the result of using a non-failsafe bolt is usually the crippling or the destruction of the aircraft.

SUMMARY OF THE INVENTION

This invention provides a failsafe expandable bolt assembly containing redundant components for joining any two structural parts, whereby a failure of one part of the bolt will not result in the failure of the entire joint. As in the expandable bolt assemblies of the prior art, an expandable sleeve and a wedging sleeve are used to expand the assembly and are positioned concentrically around a tie-down bolt. However, the two sleeves each extend through both of the joined structural parts and are removably fixed to one of the parts by means independent of the tie-down bolt, said means including a nut and an end plate designed to limit the axial movement of the expandable sleeve. The tie-down bolt is also provided with means for engaging the expandable sleeve, but this engaging means does not make the sleeves dependent on the tie-down bolt. The result of this arrangement is that the sleeves or the tie-down bolt can break without causing the other to fail in performing the joint function.

Accordingly, it is an object of this invention to provide an expandable bolt assembly which will continue to function over a long period of use as a bolt or joint even though one component should fail.

It is a further object to provide a bolt structure of the above character by utilizing as few parts as possible, thereby facilitating manufacture and assembly and lowering costs.

Other objects and advantages of the invention will become apparent upon reading the following detailed discussion and upon reference to the following drawing.

BRIEF DESCRIPTION OF THE DRAWING

The figure is a section in elevation of a bolt assembly constructed according to the invention, assembled as a joint between two structural parts.

DESCRIPTION OF THE PREFERRED EMBODIMENT

The apparatus of the bolt assembly is used to provide a joint between any two structural parts. As illustrated, a part 10 is joined by a pair of lugs 12 to a part 14 to form a joint. The bolt assembly passes through two bushings 16 and 17 in the lugs and through an elastic member 18 a component part of plate assembly 14, used to absorb vibrations. For example, the part 10 may be an aircraft engine, the part 14 being used as a plate to structurally mount the engine to the rest of the aircraft.

As in the prior art, the expandable bolt assembly utilizes wedging surfaces of concentric sleeves to force the outermost sleeve to expand into contact with the joined structural parts. The sleeves are positioned around a tie-down bolt. However, in accordance with the invention the sleeves are fixed not to the bolt but to one of the parts joined together, so that the sleeves when combined with the bolt provide failsafe multiple load paths. To so fix the sleeves it is essential that they extend through both joined structural parts. Otherwise, additional sleeves fixed only to the bolt would be necessary and redundancy would be lost. Such extension of the sleeves has the added feature of reducing the number of sleeves to two, which in turn lowers the cost and facilitates assembly. Accordingly, the assembled expandable bolt includes an expandable outer sleeve 20, which is extended through the lugs 12 and the packing 18. The sleeve has an axis 22 which coincides with the axis of an inner sleeve 24 concentrically contained within the outer sleeve 20, the inner sleeve also extending through the lugs and the packing. Both of the sleeves are positioned around but not fixed to a tie-down bolt 26 which is passed through both sleeves along their axes. The inner diameter of the sleeve 20 is tapered to provide a wedging surface 28 and the outer diameter of the inner sleeve has a taper machined to provide a mating wedging surface 30. Prior to assembly the outer diameter of the expandable sleeve 20 is less than the diameter of the bushings in the lugs 12 and the diameter of the packing 18. However, when the inner sleeve 24 is forced into its concentric position within the sleeve 20 and around the bolt, the wedging surfaces 28 and 30 cooperate to expand the outer sleeve 20 outwardly so that the bolt assembly grips the bushings 16 and 17. In this fashion the cooperating wedging surfaces operate as a means to removably fix the sleeve 20 to the part 12.

To force the inner sleeve 24 into the expandable sleeve, a nut 32 is provided having a recess 34 at one end adapted to engage the large end 36 of the inner sleeve. The nut, in addition to being internally threaded, is externally threaded at 38 so as to be removably fixed to an internally threaded end plate 40 attached to the part 10 by bolts (not shown). As the nut is turned into the end plate the recess 34 forces the mating wedging surfaces together.

In accordance with one aspect of the invention, in addition to the nut, the end plate, and the wedging surfaces cooperating to removably fix the sleeve 20 to the structural part rather than to the bolt, the end plate is formed with an internal flange 42 which cooperates with an external flange 44 at one end of the sleeve 20 to limit its movement along its axis 22.

Because the sleeve 20 is removably fixed by the foregoing structure to the part 10 rather than the bolt, in the event the bolt should break the sleeves will be retained as redundant structure so as to continue functioning as a joint. That is, although a break in the bolt 26 may result in the bottom part of the bolt falling out, the top part of the bolt and the nut will remain in position and the sleeves 20 and 24 will be prevented from working out of the bushing 16 by means of the flanges 42 and 44, and by the taper of the wedging surface 28, respectively.

To assist in physically retaining the sleeves in the event the sleeve 20 develops a radial break rather than the bolt, so that the flange 42 on the end plate is no longer operative on the portion broken off, the bolt 26 is threaded at 46 to engage the nut 32 and is provided at the other end with a head 48. A cap 50 provided with a recess 52 for engaging the head 48 is formed with a lip 54 which abuts the expandable sleeve 20, whereby that sleeve is engaged by the bolt when the bolt is tightened to the nut 32. Thus assembled, a break in the expandable sleeve 20 will not affect the joint because the part broken off will be kept in position by means of the bolt and the cap.

While the invention has been described in connection with a preferred embodiment, it will be understood that I do not intend to limit the invention to that described. On the contrary, I intend to cover all alternatives, modifications and equivalents as may be included within the spirit and scope of the invention.

I claim:

1. In a joint of two structural parts an expandable redundant bolt assembly comprising:

(a) an expandable sleeve extended through both of the parts and having an axis;

(b) an inner sleeve extended through both of the parts, said inner sleeve being concentric with and contained within said expandable sleeve;

(c) means for removably fixing said expandable sleeve to one of the parts, said means including a nut removably fixed to one of the parts;

(d) a bolt passed through said inner sleeve and both of the parts, said bolt being removably fixed to said nut;

(e) means for engaging said expandable sleeve by said bolt, and (f) expansion means including reversely tapered complementary wedging surfaces on the inner surface of said expandable sleeve and the outer surface of said inner sleeve, respectively.

2. The bolt assembly as described in claim 1 wherein said fixing means includes an internally threaded end plate attached to one of the parts and wherein said nut is externally threaded to engage said end plate and engages one end of said inner sleeve.

3. The bolt assembly as described in claim 1 wherein said fixing means includes an end plate formed with means for limiting movement of said expandable sleeve along said axis.

References Cited

UNITED STATES PATENTS

| | | | |
|---|---|---|---|
| 1,212,298 | 1/1917 | Weston | 85—79 X |
| 1,337,313 | 4/1920 | Groene | 308—71 X |
| 2,362,566 | 11/1944 | Lappert | 308—71 |
| 2,859,056 | 11/1958 | Marks. | |
| 3,009,747 | 11/1961 | Pitzer | 308—71 |

FOREIGN PATENTS 744,736  1/1933  France.

RAMON S. BRITTS, Primary Examiner

U.S. Cl. X.R.

85—79; 308—71